United States Patent [19]

Altorfer et al.

[11] Patent Number: 5,008,016

[45] Date of Patent: Apr. 16, 1991

[54] LIQUID/LIQUID EXTRACTION OF GALLIUM VALUES FROM BASIC AQUEOUS SOLUTIONS THEREOF

[75] Inventors: Alfred Altorfer, Freienstein; Ernst Wohler, Seuzach, both of Switzerland; Nicholas P. Wynn, Toronto, Canada

[73] Assignee: Rhone-Poulenc Chimie, Courbevoie, France

[21] Appl. No.: 328,673

[22] Filed: Mar. 27, 1989

[30] Foreign Application Priority Data

Mar. 25, 1988 [CH] Switzerland ...................... 01155/88

[51] Int. Cl.$^5$ ............................................ B01D 11/00
[52] U.S. Cl. ................................... 210/634; 423/112
[58] Field of Search ................ 210/634, 511; 423/112; 75/101 BE

[56] References Cited

U.S. PATENT DOCUMENTS 3,971,843  7/1976  Helgorsky et al. ................. 423/112
4,169,130  9/1979  Helgorsky et al. ................. 423/112

*Primary Examiner*—Frank Spear
*Attorney, Agent, or Firm*—Burns, Doane, Swecker & Mathis

[57] ABSTRACT

Gallium values are separated and recovered from basic aqueous solutions thereof, e.g., Bayer process aluminate liquors, by liquid/liquid extracting such a basic aqueous solution with an organic phase containing a substituted hydroxyquinoline gallium extractant dissolved in an organic solvent, and whereby the gallium values, as well as sodium and aluminum values, are transferred into the organic phase, separating the organic phase from the basic aqueous phase, next contacting the organic phase with a medium consisting essentially of water to convert the coextracted sodium values into caustic soda, separating such caustic soda from the organic phase (and optionally recycling same to the Bayer process), and then recovering the gallium values from the organic phase thus stripped of sodium values.

3 Claims, No Drawings

LIQUID/LIQUID EXTRACTION OF GALLIUM VALUES FROM BASIC AQUEOUS SOLUTIONS THEREOF

BACKGROUND OF THE INVENTION

1. Field of the Invention

The present invention relates to the liquid/liquid extraction of gallium values from basic aqueous solutions, and, more especially, from the sodium aluminate liquor emanating from the production of alumina via the Bayer process, utilizing an organic phase which includes a substituted hydroxyquinoline gallium extractant and an organic solvent, wherein, in addition to the gallium values, sodium and aluminum are also transferred into the organic phase.

2. Description of the Prior Art

In the well known Bayer process for the production of aluminum oxide from aluminum ores (bauxites), such ores are decomposed at an elevated temperature and under an increased pressure with caustic solution. Aluminum hydroxide may be precipitated from the sodium aluminate lye, which is then calcined into $Al_2O_3$ (alumina).

In this process, the gallium contained in the bauxite is concentrated in the sodium aluminate lye.

Over the course of the extraction of the gallium from this lye, large amounts of sodium, among others, are also extracted. The respective amounts (proportions) vary greatly. They depend, on the one hand, on the composition of the sodium aluminate lye, and, on the other, on the concentration and nature of the substituted hydroxyquinoline, the organic solvent and optional additives.

Typical concentration ratios of the sodium/aluminum/gallium values in the organic phase are about 250/25/1.

Under these conditions, the Bayer process loses caustic, which must be replaced.

In the known processes, in addition to gallium and aluminum, sodium is also stripped by means of acids, which mandates the use of both corrosion resistant apparatus and large amounts of acids.

Processes of this known type are described, for example, in DE-PS 25 30 880, DE-OS 27 43 475 and EP-OS 0 145 659.

In one of these processes, the organic solution charged with the extraction agent is stripped in a first state by means of a weakly concentrated strong acid, wherein the waste material is an acid solution containing sodium and aluminum salts. This solution is separated from the organic phase. Subsequently, in another stage, the organic phase is stripped with a more highly concentrated acid, whereby an acid solution of a gallium salt is obtained, which also contains minor amounts of sodium and aluminum salts.

In another known process, sodium and aluminum values are stripped in a first stage from the charged organic solution of the extractant by means of a more highly concentrated hydrochloric acid solution, while the gallium values remain in the organic phase in the form of complexes. Following the separation of the acid containing the salt, gallium is stripped in a second stage from the organic phase using a dilute solution of hydrochloric acid. The gallium chloride solution is separated, as an intermediate product, from the organic phase.

Finally, according to a third known process, gallium, sodium and aluminum values are simultaneously stripped in a first stage from the charged organic solution of the extractant, whereby an acid solution containing gallium, sodium and aluminum salts is obtained as an intermediate product.

In all of the known processes, the intermediate product can be purified further in known manner and the gallium values recovered.

SUMMARY OF THE INVENTION

A major object of the present invention is the provision of an improved process for the separation and recovery of gallium values from aluminate liquors, which improved process is far simpler and much more economical than those processes heretofore characterizing the state of this art.

Briefly, the present invention features a process for the liquid/liquid extraction of gallium values from basic aqueous solutions thereof, notably from the sodium aluminate liquors emanating from the production of alumina by the Bayer process, by contacting and extracting such an aqueous phase with an organic phase which comprises a substituted hydroxy-quinoline extractant and an organic solvent, whereby not only the gallium values, but also sodium and aluminum values are liquid/liquid extracted and transferred into said organic phase, next contacting the resulting organic phase with water alone to selectively convert essentially all of the sodium values into caustic lye (sodium hydroxide), then stripping such caustic from the organic phase, and, finally, separating and recovering the gallium values from the thus stripped organic phase.

DETAILED DESCRIPTION OF THE PREFERRED EMBODIMENTS OF THE INVENTION

More particularly according to the present invention, the preliminary step of washing or contacting the organic phase with water alone is in marked distinction to the known processes which employ highly corrosive media for such purpose. Concomitantly, the process of this invention, hence, does not require the use of corrosion/acid resistant equipment.

In a preferred embodiment of the present invention, only a small amount of water is used, advantageously flowing countercurrently in the extraction unit, such that the caustic lye is sufficiently concentrated as to be directly recyclable back into the Bayer process.

Because the sodium is washed out in a first stage, i.e., following the liquid/liquid extraction of the sodium aluminate utilizing the aforementioned organic extractant, in the downstream process stages the flow volumes and, thus, the size requirements of the apparatus, are considerably smaller vis-a-vis the known processes.

Depending on the process conditions, the consumption of acid up to the recovery of the intermediate product is also significantly reduced.

If the acid cannot be neutralized following the prior art downstream separation of the gallium values using alkaline waste waters of the Bayer process, appreciable volumes of neutralizing chemicals must be used as a function of the amounts of acid obtained, or an acid recovery unit must be provided.

Representative substituted hydroxyquinoline extractants which may be used in the process of the present invention include those described, for example, in U.S. Pat. Nos. 3,971,843 and 4,724,129.

In order to further illustrate the present invention and the advantages thereof, the following specific example is given, it being understood that same is intended only as illustrative and in nowise limitative.

EXAMPLE 100 ml of a kerosene solution containing 8% by weight of "KELEX 100" was contacted with a Bayer process aluminate liquor containing, per liter, 162 g of $Na_2O$, 62 g of $Al_2O_3$ and 162 mg of gallium.

After agitation of the mixture, to reach equilibrium and after separation of the phases, an organic phase containing 4.25 g/l of $Na_2O$, 1.17 g/l of $Al_2O_3$ and 0.129 g/l of Ga, was obtained.

This organic phase was mixed with water in a ratio by volume [aqueous phase]/[organic phase] equal to 0.2.

After settling, an aqueous phase containing 20.4 g/l of $Na_2O$, 0.26 g/l of $Al_2O_3$ and less than 1 mg/l of Ga was obtained. The resulting organic phase contained 0.175 g/l of $Na_2O$, 1.12 g/l of $Al_2O_3$ and 0.129 g/l of Ga.

The gallium was back-extracted from the organic phase either by a washing step using a concentrated sulfuric acid solution or by a preliminary washing step using a dilute acid solution to partially remove the aluminum values contained therein, followed by a second washing step using a concentrated acid solution.

Such a process of back-extraction of the gallium values from the organic phase is described, for example, in published French Application No. 2,532,295.

The present example clearly evidences that the washing of the organic phase with water permits 96.5% of the sodium values to be recovered, and, therefore, available to be recycled, as caustic soda, into the Bayer cycle.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A process for the liquid/liquid extraction and recovery of gallium values from basic aqueous solutions thereof, comprising liquid/liquid extracting such basic aqueous solution with an organic phase which comprises a substituted hydroxyquinoline gallium extractant dissolved in an organic solvent, and whereby the gallium values, as well as sodium and aluminum values, are transferred into said organic phase, separating said organic phase from said basic aqueous phase, next contacting the organic phase with a medium consisting essentially of water to convert said coextracted sodium values into caustic soda, separating such caustic soda from said organic phase, and then recovering the gallium values from said organic phase thus stripped of sodium values.

2. The process as defined by claim 1, said basic aqueous solution comprising a Bayer process aluminate liquor.

3. The process as defined by claim 2, further comprising recycling separated caustic soda to such Bayer process.

* * * * *